United States Patent
Grimwood et al.

(10) Patent No.: US 11,366,740 B2
(45) Date of Patent: Jun. 21, 2022

(54) DEBUGGING SHARED MEMORY ERRORS

(71) Applicant: Undo Ltd., Cambridge (GB)

(72) Inventors: Geoffrey Finn Grimwood, Cambridge (GB); Lee Marshall, Cambridge (GB); Marco Barisione, Cambridge (GB); Mark Williamson, Cambridge (GB); Gregory Edward Warwick Law, Cambridge (GB)

(73) Assignee: Undo Ltd., Cambridge (GB)

( * ) Notice: Subject to any disclaimer, the term of this patent is extended or adjusted under 35 U.S.C. 154(b) by 23 days.

(21) Appl. No.: 16/883,077

(22) Filed: May 26, 2020

(65) Prior Publication Data

US 2021/0374037 A1 Dec. 2, 2021

(51) Int. Cl.
*G06F 11/36* (2006.01)
*G06F 11/34* (2006.01)
(Continued)

(52) U.S. Cl.
CPC .......... *G06F 11/3636* (2013.01); *G06F 9/544* (2013.01); *G06F 11/366* (2013.01); *G06F 16/1734* (2019.01); *G06F 9/30043* (2013.01); *G06F 9/3851* (2013.01); *G06F 11/1438* (2013.01); *G06F 11/2033* (2013.01); *G06F 11/3471* (2013.01); *G06F 11/3476* (2013.01);
(Continued)

(58) Field of Classification Search
CPC .... G06F 9/544; G06F 9/30043; G06F 9/3851; G06F 16/1734; G06F 11/3636; G06F 11/366; G06F 11/3644; G06F 11/3664; G06F 11/36; G06F 11/3668; G06F 11/302; G06F 11/1438; G06F 11/3476; G06F 11/3471; G06F 11/2097; G06F 11/2033

See application file for complete search history.

(56) References Cited

U.S. PATENT DOCUMENTS 9,268,666 B2 * 2/2016 Law .................... G06F 11/3668
10,649,899 B2 * 5/2020 Luo ........................ G06F 11/36
(Continued)

FOREIGN PATENT DOCUMENTS

WO 2007045920 A2 4/2007

OTHER PUBLICATIONS

Henrik Thane et al., Replay Debugging of Real-Time Systems Using Time Machines, 2003, [Retrieved on Jan. 3, 2022]. Retrieved from the internet: <URL: https://ieeexplore.ieee.org/stamp/stamp.jsp?tp=&arnumber=1213515> 8 Pages (1-8) (Year: 2003).*

(Continued)

*Primary Examiner* — Anibal Rivera
(74) *Attorney, Agent, or Firm* — Michael Best & Friedrich LLP

(57) ABSTRACT

There is provided a method for debugging errors in a shared memory. The method comprises executing instrumented machine code of a plurality of processes to generate a recorded execution of each of the plurality of processes for deterministic replay of the recorded execution. The method further comprises logging accesses to the shared memory by each of the plurality of processes in a shared memory log for debugging errors in the shared memory by analysing the recorded executions and the shared memory log. The shared memory log is accessible by each of the plurality of processes.

17 Claims, 11 Drawing Sheets

(51) Int. Cl.

| | |
|---|---|
| *G06F 9/46* | (2006.01) |
| *G06F 16/17* | (2019.01) |
| *G06F 9/54* | (2006.01) |
| G06F 11/14 | (2006.01) |
| G06F 9/30 | (2018.01) |
| G06F 11/20 | (2006.01) |
| G06F 9/38 | (2018.01) |

(52) U.S. Cl.
CPC ...... *G06F 11/3644* (2013.01); *G06F 11/3668* (2013.01)

(56) References Cited

U.S. PATENT DOCUMENTS

| | | | |
|---|---|---|---|
| 2010/0318991 A1* | 12/2010 | Venkitachalam | ... G06F 9/45533 718/1 |
| 2012/0096441 A1* | 4/2012 | Law | ..... G06F 11/3668 717/127 |
| 2017/0255560 A1* | 9/2017 | Luo | ..... G06F 12/0833 |
| 2018/0173612 A1* | 6/2018 | Law | ..... G06F 11/302 |

OTHER PUBLICATIONS

Satish Narayanasamy et al., Recording Shared Memory Dependencies Using Strata, Oct. 21-25, 2006, [Retrieved on Jan. 3, 2022]. Retrieved from the internet: <URL: https://www.cs.purdue.edu/homes/xyzhang/spring07/Papers/ASPLOS-06-Strata.pdf> 12 Pages (1-12) (Year: 2006).*

* cited by examiner

```
.section .data
buf:

.section .text
.globl main
main:

mov  $buf, %ecx   #ecx points at buf
.start:

mov  $3, %eax     #do syscall #3 (read)
  mov  $0, %ebx     #from fd 0 (stdin)
  mov  $1, %edx     #read a single char
  int  $0x80        #make the system call mov  $4, %eax     #do syscall #4 (write)
  mov  $1, %ebx     #to fd 1 (stdout)
                    #ecx still at buff
                    #edx still contains 1
  int  $0x80        #make the system call cmpb $10, buff    #did user hit enter?
  jne  .start       #if not, round again
  ret
```

| | PROCESS ID 802 | MODE 803 | ADDRESS 804 | LENGTH 805 | TIME 806 |
|---|---|---|---|---|---|
| 801a — | Pxx | r | xxxx | xx | xx:xx:xx |
| 801b — | Pyy | w | yyyy | yy | yy:yy:yy |
| | ⋮ | ⋮ | ⋮ | ⋮ | ⋮ |
| 801n — | Pzz | w | zzzz | zz | zz:zz:zz |

FIGURE 8

T = $t_1$
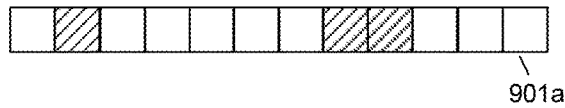
T = $t_2$
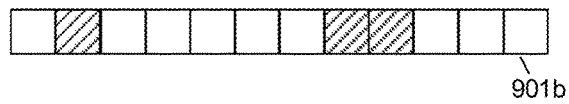
+ T = $t_3$
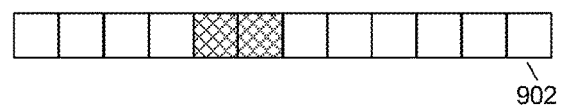 = 
T = $t_4$
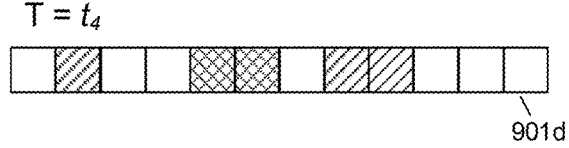
+ T = $t_5$
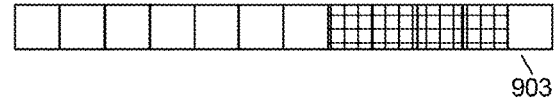 = 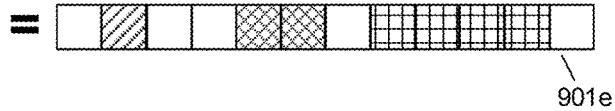
FIGURE 9

DEBUGGING SHARED MEMORY ERRORS

FIELD OF THE INVENTION

This invention relates to methods, apparatus and computer program code to facilitate the debugging of computer programs. In particular, debugging of errors in a shared memory in multi-process environments is described.

BACKGROUND TO THE INVENTION

In WO2007/045920, hereby incorporated by reference in its entirety, we described techniques which allow a program, more particularly the machine code of a program, to effectively be run backwards. This is helpful as it allows an error to be traced backwards from, say, the moment it caused the program to crash until the error first appeared. As the skilled person will appreciate, crashing can take many forms, generally summarised as the program not running as intended—for example a segmentation fault, and unhandled exception, or an infinite loop.

Whilst backwards execution of a program is invaluable in debugging, it would be useful to have additional tools to make the debugging process easier and faster. There is a particular problem in locating and dealing with bugs which are not readily reproducible—for example a user may occasionally report a program as slow but identifying and correcting the cause of the problem can be difficult if the fault is intermittent.

SUMMARY OF THE INVENTION

According to a first aspect, there is provided a method for debugging errors in a shared memory. The method comprises executing instrumented machine code of a plurality of processes to generate a recorded execution of each of the plurality of processes for deterministic replay of the recorded execution. The method further comprises logging accesses to the shared memory by each of the plurality of processes in a shared memory log for debugging errors in the shared memory by analysing the recorded executions and the shared memory log. The shared memory log is accessible by each of the plurality of processes.

The shared memory may provide a means of communication between the plurality of processes. However, it is possible that one or more of the processes have been incorrectly programmed. During the operation of an incorrectly programmed process, the process may erroneously cause the shared memory to become corrupted. Another process that subsequently attempts to access the corrupted memory may then fail through no fault of its own. Attempts to debug the failed process will not resolve the problem as the root cause of the failure was due to a programming error in another process. In addition, given that many processes may have access to the shared memory, it may be challenging to identify the process responsible for causing the error in the shared memory.

In order to provide debugging of errors in the shared memory, the machine code of the plurality of processes is instrumented such that execution of the instrumented machine code generates a recorded execution of the process that can be deterministically replayed. Shared memory accesses by each of the plurality of processes can be logged in a common shared memory log. The recorded executions and the shared memory log may be analysed to debug errors in the shared memory and to identify the process that caused the error in the shared memory. The error in the identified process may be fixed and thus, the failure of any processes caused by accessing an invalid state of the shared memory can be resolved.

Thus, the method may further comprise identifying a process of the plurality of processes that caused an error in the shared memory based upon the shared memory log and the recorded execution of each of the plurality of processes.

The plurality of processes may be a subset of the processes that have access to the shared memory. For example, a user may select particular processes to record and log accesses to the shared memory. The techniques described herein means that it is not a requirement that all of the processes that access the shared memory need be recorded and their accesses logged.

The plurality of processes may be separate programs or may be different instances of the same program, or may be a combination of different instances of the same program and different programs.

The method may be carried out by a backwards debugger. The backwards debugger may be configured to replay a recorded execution of a process, wherein replaying comprises reversing the process' state to a previous state in the recorded execution. The use of a shared memory log in combination with techniques for backwards debugging enables a backwards debugger to rewind to any point in the history of the plurality of processes to determine how the plurality of processes are interacting with the shared memory. In addition, the history of a particular location of the shared memory can also be determined and analysed.

The method may further comprise generating a list comprising accesses by the plurality of processes to a location of the shared memory based upon the shared memory log. The method may further comprise replaying a recorded execution of one of the plurality of processes. The method may further comprise generating a list comprising previous accesses by the plurality of processes to a location of the shared memory prior to a current point in the replayed execution based upon the shared memory log. Generating the list may further be based upon the replaying the recorded executions of each of the processes of the plurality of processes. Generating the list may further be based upon analysing the operations performed with respect to a particular memory location in the shared memory. The generated list of accesses and the recorded executions may be analysed to identify the process that caused the error in the shared memory.

The shared memory log may comprise data indicative of one or more of the following: an access mode, a location of the shared memory being accessed, an access length and a time of access. The time of access may be used to identify the instruction that performed the corresponding access in a particular process. Alternatively, or in addition, the shared memory log may further comprise data indicative of the instruction performing the access.

Data associated with an access to a location of the shared memory may be determined based upon replaying a corresponding recorded execution. In this way, the size of the shared memory log may be reduced. Alternatively, the data associated with the access may be stored in the shared memory log to provide a potentially quicker determination of the data. The list of accesses for a particular memory location described above may comprise the data associated with the accesses.

The accesses may be stored in the shared memory log in order of execution of the shared memory accesses by the plurality of processes. That is, an access that occurs at an earlier point in time may appear before an access that occurs at a later point in time in the shared memory log. By arranging the entries in order of execution, the shared memory log may be used to synchronise the plurality of processes during replay of the recordings.

The shared memory log may comprise a cache indicative of an initial state of the shared memory. The method may further comprise determining whether a shared memory access alters the data stored in the shared memory based upon a comparison to the cache when recording the execution of the plurality of processes; and updating the shared memory log with cache update data based upon the change in the shared memory caused by the shared memory access. Thus, cache update data may be considered as difference data. The cache may be updated based upon the cache update data. In this way, the data required for deterministic replay of shared memory accesses may be captured efficiently. In particular, where the shared memory is read more frequently than it is modified, using a cache and cache update data provides a more efficient method than capturing returned data for all shared memory reads (which is a source of non-determinism for a process).

The method may further comprise determining data associated with the shared memory access based upon the cache and the cache update data when replaying a process of the plurality of processes. Thus, the cache and the cache update data may be used to provide the data that would have been returned from the shared memory in the original execution of the process.

The machine code may be dynamically instrumented for logging shared memory accesses. That is, the machine code may be instrumented at the point of execution rather than prior to execution such as during the generation of the machine code (compilation)

According to another aspect, there is provided a computer system comprising a memory storing processor readable instructions and a processor arranged to read and execute instructions stored in the memory. The processor readable instructions are arranged to cause the processor to carry out a method comprising: executing instrumented machine code of a plurality of processes to generate a recorded execution of each of the plurality of processes for deterministic replay of the recorded execution; and logging accesses to the shared memory by each of the plurality of processes in a shared memory log for debugging errors in the shared memory by analysing the recorded executions and the shared memory log. The shared memory log is accessible by each of the plurality of processes.

According to a further aspect, there is provided a non-transitory computer readable medium comprising processor readable instructions. The processor readable instructions are arranged to cause a processor to carry out a method comprising: executing instrumented machine code of a plurality of processes to generate a recorded execution of each of the plurality of processes for deterministic replay of the recorded execution; and logging accesses to the shared memory by each of the plurality of processes in a shared memory log for debugging errors in the shared memory by analysing the recorded executions and the shared memory log. The shared memory log is accessible by each of the plurality of processes.

It will be appreciated that features described in the context of one aspect may be combined with features described in the context of another aspect.

It will also be appreciated that aspects can be implemented in any convenient form. For example, aspects may be implemented by appropriate computer programs which may be carried on appropriate carrier media which may be tangible carrier media (e.g. disks) or intangible carrier media (e.g. communications signals). Aspects may also be implemented using suitable apparatus which may take the form of programmable computers running computer programs arranged to implement the aspects.

One particularly useful function is the ability to ask the question 'where did this [register] value come from?'. This information can be provided by capturing and storing program state information identifying a write to a processor register (using the instrumented machine code), and then using this information to identify a most recent write to the register prior to a debug point in the program (machine code). In preferred examples the automatic identifying comprises sub-dividing the machine code into blocks of instructions where in each block if one instruction (a first instruction) executes then (all) subsequent instructions in the block also execute. The instrumented machine code is then used to generate register write data for each executed block of instructions, this data identifying one or more registers written by the blocks of instructions. Then a most recent write to the register may be identified by searching block-wise through the register write data to determine the most recent instruction modifying the register. This procedure may be implemented as part of the reverse search previously described. The skilled person will appreciate that watchpoints which trigger an exception when a particular memory address is changed may be implemented by the processor itself.

Although it is helpful to identify when (at which instruction) a processor register is most recently changed, it is particularly desirable to be able to trace back the modification to the register, potentially to the origin of the data. The ultimate source of the data may be, for example, an input to a program, data from a file, data from a user input, data defined by an instruction, and so forth. Although the techniques we have described above in principle enable data flow to be traced back manually, this is preferably automated. In broad terms, this can be achieved by re-running the deterministic reference execution multiple times, tracing back one step each time, an approach which is facilitated by the use of 'snapshots' as described earlier.

In some cases the modification to a register has a single source, but in others there may be multiple different sources, potentially with some shared history. An attempt to track changes in register values running forwards in time would, in effect, construct a tree showing modifications of the all the registers and memory locations, which is impracticable. However examples of the techniques we describe, in particular the technique of performing a reverse search, in effect trace back from a leaf node towards the trunk rather than attempting to build the complete tree, and therefore become practicable to implement. It is relatively straightforward to deterministically replay the reference execution to, in effect, step backwards in time asking the question "where did the value modifying the register come from?", and then "where did that value come from?" and so forth. It will be appreciated that where a data structure is constructed with such a chain then this may also be used to identify where, for example, a value is modified in two different ways which are then recombined to modify a further register value.

Thus examples of the techniques we describe facilitate determining where register (and other) values come from. This can be extremely difficult using other methods.

One application of such techniques is in analysing the security of a program, in particular by identifying the origin of a data value and whether or not the data is subject to any intermediate modification or checks/validation. This can be used, for example, to identify whether a value such as a memory allocation value or buffer size is subject to security validation—examples of the techniques we describe make it relatively straightforward to perform this check. This is useful because a large percentage of viruses make use of some form of buffer overrun including, for example, the Heartbleed security bug in the OpenSSL cryptography library.

We have described techniques for identifying writes to a processor register. In examples the method includes a procedure for looking forwards to identify subsequent (next) register and/or memory changes dependent upon an identified read from memory or a processor register.

The skilled person will appreciate that the stored program analysis data may be processed in any convenient manner. For example it may be output in raw or graphical form for user evaluation. Thus in examples of the above described method a user interface is provided, for interacting with the program analysis method/system. Optionally an interface may also be provided to facilitate selective capturing of the log of non-deterministic events in response to a detected condition such as an error or bug in the program. For example a circular buffer of the non-deterministic events may be maintained and saved to a file on a non-transient medium when a program/bug/error/fault is detected.

Also described is a non-transitory carrier medium carrying a data structure for use in a method as described above, the data structure comprising: at least a portion of said machine code representing the program; a log of non-deterministic events for at least a portion of said program having a bug; and at least one of: program starting state data comprising data defining a complete or substantially complete copy of memory and registers used by the program at a starting state of said portion of said machine code representing said program, and reference state data, wherein said reference state data comprises data defining content read from pages of memory accessed during a reference execution of at least said portion of said machine code, wherein said content comprises content read from the page the first time that the page is accessed during said reference execution.

Examples of such a data structure provide information for remote post-hoc analysis of the code. In one approach a snapshot (as defined elsewhere herein) is taken to define a starting state for the machine code; this may but need not be an initial start point—that is the program/machine code may be started at some intermediate point. The event log contains the non-deterministic changes and other changes can be computed by re-executing.

In another approach, however, there is no need to take a snapshot at the start of the machine code. Instead the contents of a page of memory are read the first time the (each) page is accessed during the reference execution. Trapping accesses to memory locations is described later with reference to non-determinism but it should be recognised that the technique described here is not related to non-determinism—instead it is effectively a way to record the starting state "just in time". This is thus a deterministic approach defined by the (portion of) machine code in the data structure. Such an approach can, for example, provide reduced memory usage in some situations.

Thus in examples of this approach one can begin, for example, with an empty starting state and then during the reference execution "fault in" state when it is first accessed. For example, one approach may begin with all (relevant) memory set up by the MMU (memory management unit) to fault when accessed, and then as the reference execution is run, respond to faults by creating events in the event log of the page that has been accessed, and then changing the page's permissions so that it the page does not fault the next time. Alternatively the machine code may be instrumented to achieve a similar effect.

Optionally the machine code in the data structure may additionally (or alternatively) comprise instrumented machine code instrumented to permit deterministic replay of non-deterministic events and/or post hoc execution analysis. As the skilled person will also appreciate, examples of such a data structure may be distributed between a plurality of coupled components in communication with one another.

Also described is a method of capturing reference state data for deterministic re-execution of a computer program for analysis, wherein said program is represented by machine code, the method comprising: recording data defining content read from portions of memory accessed during a reference execution of said machine code; wherein said content comprises content read from a portion of memory the first time that the page is accessed during a reference execution of said computer program for re-execution; and wherein said recorded data comprises reference state data defining said content is usable for deterministic re-execution of said machine code.

In some preferred examples the method further comprises configuring the portion of memory accessed by the machine code, to generate a fault when accessed. In preferred examples this portion of memory is a page of memory. The procedure then responds to the fault to capture data read from the portion/page of memory in an event log and changes an access permission for the portion/page such that said fault is not generated when that portion/page of memory is accessed subsequently.

There is further described processor control code to implement examples of the above described method, and corresponding systems. The code is provided on a non-transitory physical data carrier such as a disk or programmed or non-volatile memory. Again the code may be distributed amongst coupled components in a system.

There is further described a backwards debugger configured to generate program analysis data, the backwards debugger comprising software to: run a first instrumented version of machine code representing the program, wherein said running defines a reference execution of said program; capture a log of non-deterministic events during said reference execution such that the machine code can be re-run in a deterministic manner to reproduce states of a processor and memory during the re-running; generate a second instrumented version of said machine code, said instrumented version of said machine code comprising instrumented machine code to replay execution of said machine code representing the program and to capture and store program state information during said replayed execution, wherein said program state information comprises one or both of one or more values of registers of said processor and one or more values of memory locations used by said program; run said instrumented machine code whilst reproducing said non-deterministic events during said running to reproduce said reference execution; and capture said program state information whilst reproducing said reference execution to generate said program analysis data.

There is further described a backwards debugger configured to implement a method of returning to a state in the history of execution of a computer program, said state comprising a set of values of one or more registers of a processor on which the program is running and of working memory space to which the program has access, the method comprising: identifying, in machine code representing said program, instances of machine code instructions associated with substantially non-deterministic events; generating a first instrumented version of said program machine code instructions to handle said substantially non-deterministic events; executing said first instrumented version of said program machine code; storing a time series of said states, including a log of said non-deterministic events, during said executing to define a reference execution; restoring a said stored state; and executing said first instrumented version of said program machine code forward in time starting at said restored state to return to said state in said program history of execution; wherein the backwards debugger is further configured to: input data defining an analysis to be performed on said machine code; generate a second instrumented version of said program machine code to perform said analysis; run said second instrumented version of said program machine code whilst reproducing said non-deterministic events during said running to reproduce said reference execution of said program; and store program analysis data generated by said second instrumented version of said machine code when said second instrumented version of said program machine code is run.

As previously described, in examples the first time the machine code representing the program is run it is modified to capture and log non-deterministic events. Thereafter it is instrumented to replay the log in a deterministic manner, in order to facilitate one or multiple instances of deterministic execution replay for analysis.

BRIEF DESCRIPTION OF THE DRAWINGS

The operation of an example backwards debugging system, in the context of which aspects and embodiments of the invention may operate, is described with reference to the accompanying drawings in which:

FIG. 2 shows an example Linux program;

FIG. 8 shows an exemplary shared memory log;

FIG. 9 shows an illustrative example of a updating a cache corresponding to the shared memory;

DETAILED DESCRIPTION

To provide context for describing the operation of embodiments of the invention we first describe some backwards debugging systems in the context of which some preferred embodiments of the invention operate.
Backwards Debugging Systems Broadly a backwards debugger allows a program to be executed in such a manner that it appears that the execution is backwards, that is in a reverse direction to the normal direction of program code execution. Thus in a backwards debugger is a debugger that allows a program being debugged to be rewound to an earlier state, and then allows the user to inspect the program's state at that earlier point. Such a debugger ideally provides commands to allow the user to step the program back in small well-defined increments, such as single source line; a machine instruction; step backwards into, out of, or over function calls and the like.

We will describe bidirectional or backwards debugging where (preferably) substantially the complete state of a running computer program can be examined at any point in that program's history. This uses a mechanism to 'unwind' the program's execution. This is a difficult problem, because as a program executes previous states are generally irretrievably lost if action is not taken to record them (for example, writing to a memory location causes whatever information was previously at that memory location to be lost).

There are two approaches to solving this problem: firstly to log every state transition as the program executes; secondly, to re-execute the program from an earlier recorded state to reach the desired point in its history. The first suffers from several problems, including slow forwards execution of the program, and the generating of large amounts of data as the program executes. The second approach is generally more efficient but requires that non-determinism be removed on re-execution so that the program follows exactly the same path and transitions through exactly the same states each time it is re-executed.

Figure 1:
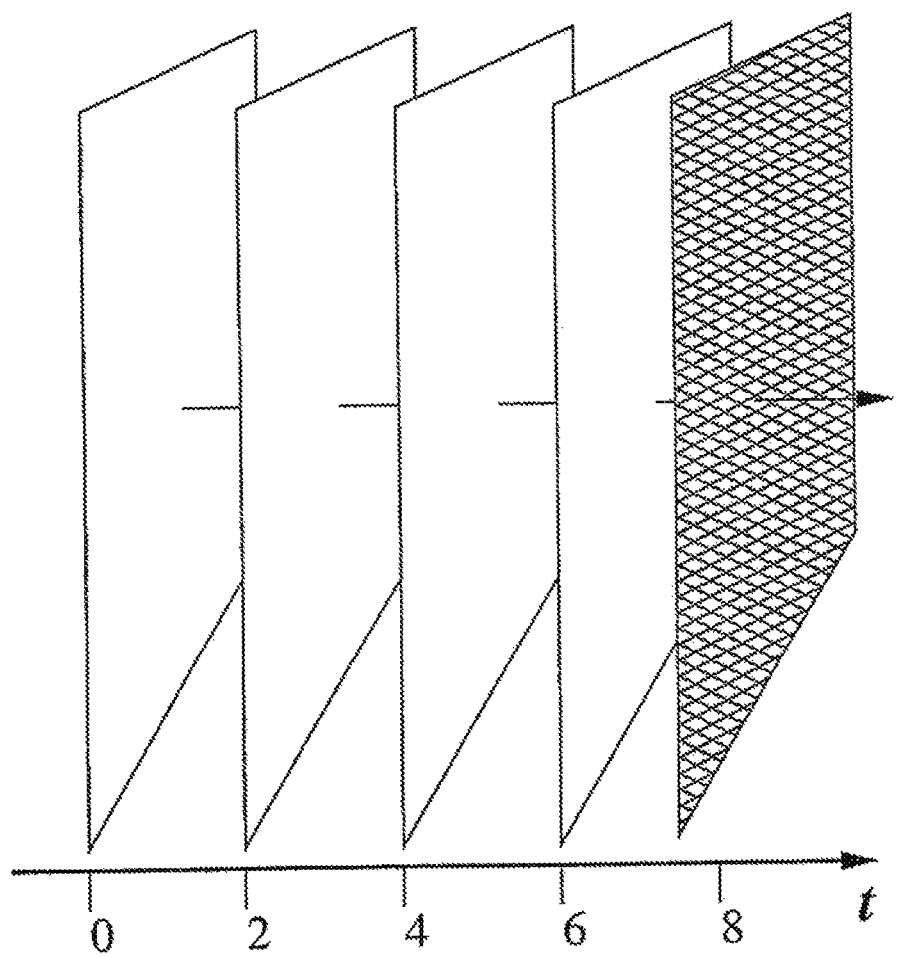
FIG. 1 shows a running program with snapshots at regular 2 second intervals.

We describe a mechanism whereby a 'snapshot' is periodically taken of a program as it runs. To determine the program's state at a given time t in its history, we start with the snapshot taken most recently before time t, and execute the program forwards from that snapshot to time t. For example, FIG. 1 depicts a program under execution. The program has been running for a little over 7 seconds, with snapshots having been taken every 2 seconds. In order to find the state of this program at t=5 s the snapshot taken at 4 s is replayed for 1 s. We use the inherent determinism of a computer to ensure that the when the snapshot of the program is replayed to time t, it will have exactly the same state as had the original program at time t. The UNIX fork system call provides one mechanism to snapshot a process.

Unfortunately, while a computer itself is deterministic, computer programs do not run deterministically, due to non-deterministic inputs. That is, when we say a computer is deterministic we mean that given the same set of inputs, it will always run through the same state changes to the same result. Therefore, if we wish to ensure that a snapshot of a program is replayed exactly as the original, we should ensure that exactly the same inputs are provided to the replayed program as were provided to the original.

Fortunately, most modern, 'protected' operating systems provide a sanitised 'virtual environment' in which programs are run, commonly referred to as a process. An important feature of processes in this context is that they strictly limit the computer resources that are accessible to a program, making it practical to control all sources of non-determinism that may influence a program's execution. These resources include the memory that is accessible by the process, as well as operating system resources, such as files and peripherals. We define all such resources as the process state. The memory and register set of a process make up its internal state, while operating system resources that it may access make up its external state. The controlled environment of a process means that with the help of instrumentation it is practical to eliminate substantially all significant sources of non-determinism during execution of the process.

We have identified four categories of non-determinism for a computer process executing on a protected operating system:
1) Non-deterministic instructions are instructions which may yield different results when executed by a process in a given internal state. The most common form of non-deterministic instruction is the system call (i.e. the instruction used to make a request of the operating system). For example, if a process issues a system call to read a key press from the user, the results will be different depending on which key the user presses. Another example of a non-deterministic instruction is the Intel IA32 rdtsc instruction, which obtains the approximate number of CPU clock ticks since power on.
2) A program executing multiple threads will show non-determinism because the threads' respective transactions on the program's state will occur in an order that is non-deterministic. This is true of threads being time-sliced onto a single processor (because the operating system will time-slice at non-deterministic times), and of threads being run in parallel on multiprocessor systems (because concurrent threads will execute at slightly different rates, due to various external effects including interrupts).
3) Asynchronous events are events issued to the process from the operating system that are not the direct result of an action of that process. Examples include a thread switch on a multithreaded system, or a timer signal on a UNIX system.
4) Shared memory is memory that when a location read by the program being debugged does not necessarily return the value most recently written to that location by the program being debugged. For example, this might be because the memory is accessible by more than one process, or because the memory is written to asynchronously by the operating system or by a peripheral device (often known as DMA—Direct Memory Access). As such out-of-band modifications are performed outside of the context of the program being debugged, this may result in non-determinism during re-execution.

Preferably a bidirectional or backwards debugging system should be able to work in all circumstances, and preferably therefore the aforementioned sources of non-determinism should be eliminated. To achieve this, all non-deterministic events are recorded as the debugged process executes. When replaying from a snapshot in order to obtain the program's state at some earlier time in history, the recorded non-deterministic events are faithfully replayed. The mechanism used to employ this is described in the following section.

We employ a technique of machine code instrumentation in order to record and replay sources of non-determinism. Our instrumentation is lightweight, in that it modifies the instrumented program only slightly, and is suitable for use with variable length instruction sets, such as Intel IA32.

We instrument by intercepting control flow at regular intervals in the code. Sections of code between interception are known as basic blocks. A basic block contains no control flow instructions, and no non-deterministic instructions—that is, a basic block contains no jumps (conditional or otherwise) or function calls, nor system calls or other non-deterministic instructions, or reads from shared memory. Control flow and non-deterministic instructions are therefore termed basic block terminators.

An instrumented program is run such that all the basic blocks are executed in the same order and with the same results as would be the case with its equivalent uninstrumented program. The instrumentation code is called between each basic block as the instrumented program executes. Each of the program's original basic blocks are copied into a new section of memory, and the basic block terminator instruction is translated into one or more instructions that ensure the instrumentation code is called before control continues appropriately.

As an example, consider the Linux program shown in FIG. 2, written in Intel IA32 assembler (using GNU/AT&T syntax):

This simple program reads characters from stdin, and echos them to stdout. The program contains four basic blocks, terminated respectively by the two int $0x80 instructions, the jne and the ret instruction at the end.

For convenience, we term the uninstrumented program P, and its instrumented equivalent P'. For each basic block there is an uninstrumented basic block $B_n$, and a corresponding instrumented basic block $B'_n$.

Figure 3:
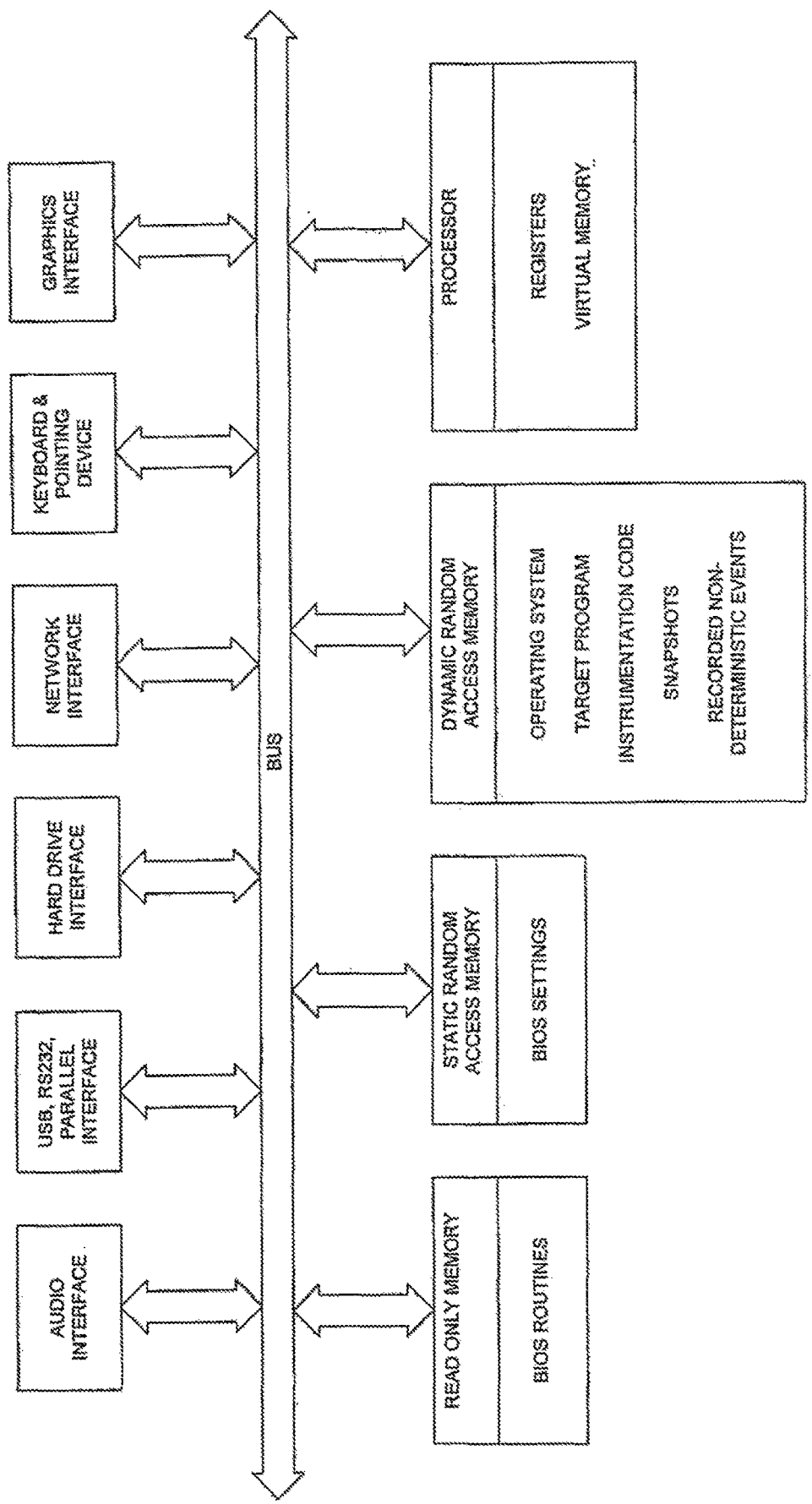
FIG. 3 shows an example of a computer system.

FIG. 3 shows an example of a computer system on which the program may be executed and on which bi-directional debugging may be performed. The target program and the debugger both reside in physical memory. Processor registers may be captured and stored in snapshots along with memory used by the target program process. The debugger may operate within the virtual memory environment provided by the processor and the operating system, or it may operate on a single process computer.

Figure 4:
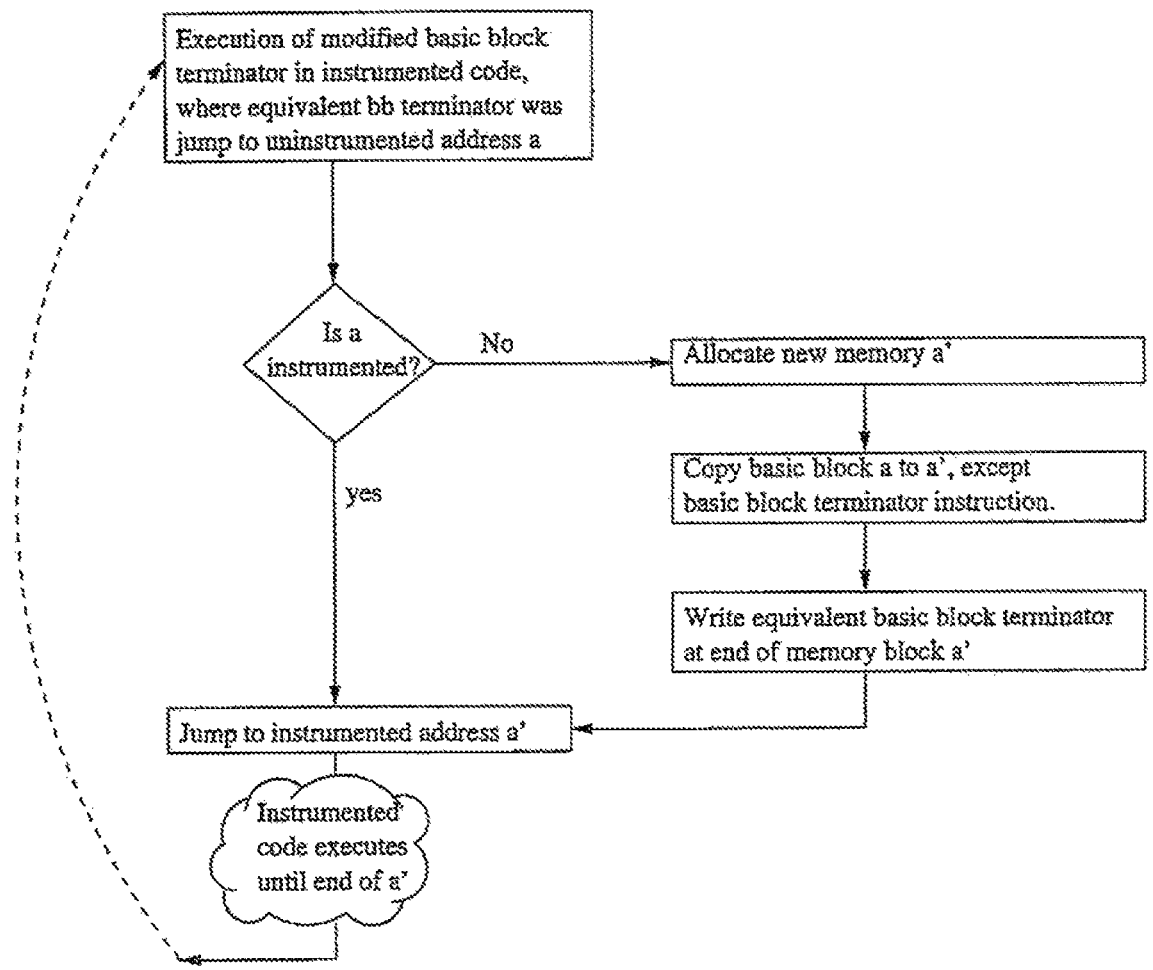
FIG. 4 shows a flowchart showing the instrumentation algorithm.

FIG. 4 shows a flowchart that illustrates the instrumentation algorithm. (Note that algorithm instrumented code in an 'on-demand' fashion, as that program executes; an ahead of time algorithm is also practical.)

Figure 5:
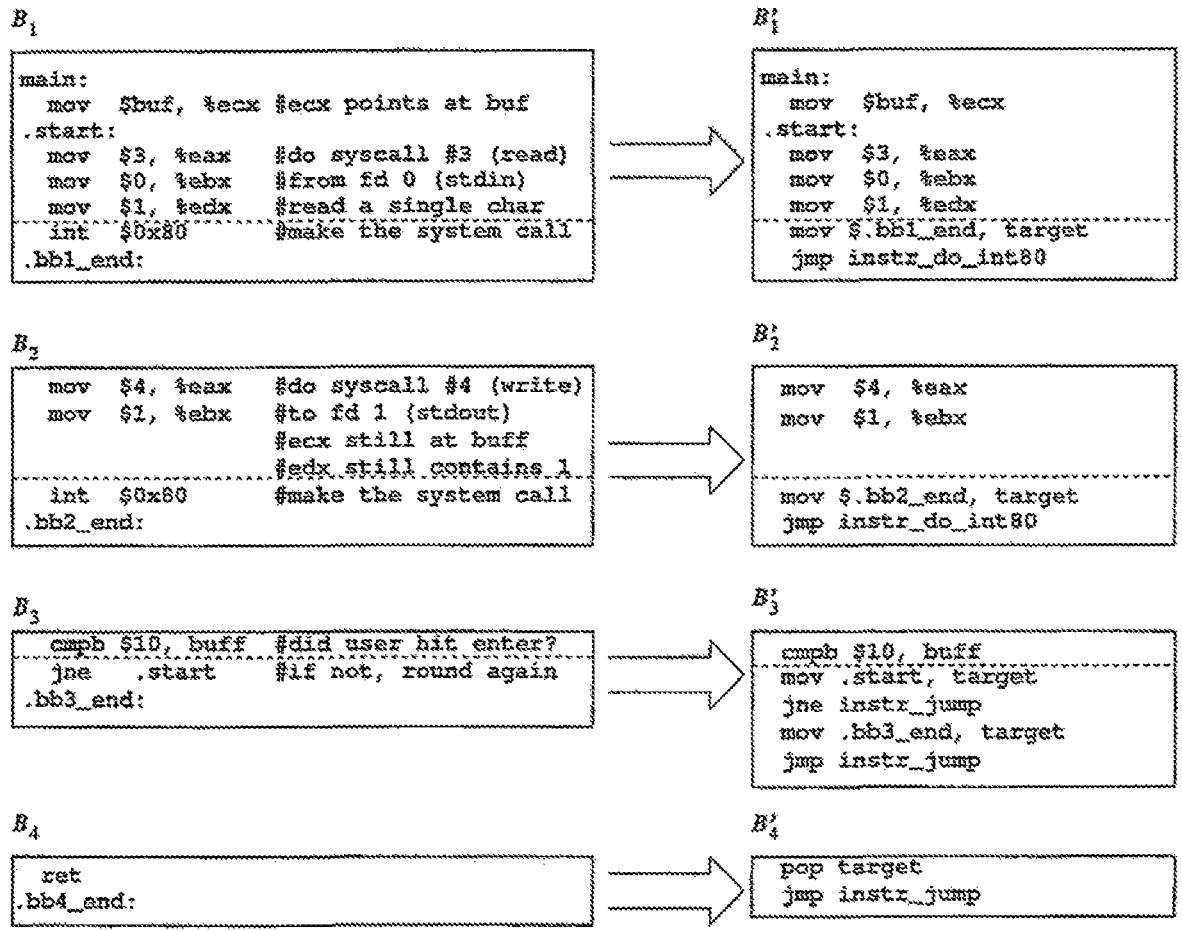
FIG. 5 shows the program P and its instrumented counterpart P'.

FIG. 5 shows the program in the previous example broken into its four basic blocks, and how those basic blocks are copied, and how the basic block terminator instruction for $B_n$ is replaced in $B'_n$ with one or more instructions that branch into the instrumentation code. The label target is used to store the uninstrumented address at which control would have proceeded in the uninstrumented version of the program; the instrumentation code will convert this to the address of the corresponding instrumented basic block and jump there.

The copying and modifying of basic blocks for instrumentation may be carried out statically before the program is executed, or may be done dynamically during the program's execution (i.e. on demand). Here, when the instrumentation code looks up the address of an instrumented basic block given the corresponding uninstrumented address, if the instrumented version cannot be found then the uninstrumented block is copied and the basic block terminator translated. (Our implementation uses the dynamic approach.)

We will next describe making replay deterministic. Using the instrumentation technique described in 3 we are able to remove all sources of non-determinism from a process. We deal with each of the four kinds of determinism separately in subsections below.

Non-deterministic instructions: During the reference execution the results of all non-deterministic instructions (including system calls) are recorded in an event log. When playing a process forwards from a snapshot in order to recreate a previous state, the process is said to be in 'replay mode'. Here, the instrumentation code ensures that non-deterministic instructions are not executed, and instead their results are synthesised using data stored in event log. There the process' internal state is artificially reconstructed to reflect the results of the corresponding non-deterministic instruction produced during the reference execution.

For example, when replaying a system call, this means restoring the system call's return code, as well as any of the process's memory that was modified as a result of the system call.

External state (operating system resources): Note that it is not necessary to reconstruct the process' external state when recreating the results of non-deterministic instructions, because the process' interaction with its external state is in general governed entirely through system calls. For example, consider a process the opens a file for reading during the reference execution. The process will receive a file descriptor (also known as a file handle) which it will use with future calls to the OS to read from the file. The file descriptor is obtained and used with system calls. These system calls will be shortcut in the replay process. In effect, the instrumentation code will ensure that the replay process 'believes' that it has the file open for writing, but in fact it does not.

However, this is not true for OS resources that are visible from the process' internal state. As an example, consider a call to the OS to expand a process' address space (i.e. the memory it can access). Since this affects a resource which the replay process will access directly (i.e. memory), this system call should be reissued on replay to ensure that the effects of the non-deterministic instruction in question are faithfully replayed.

Note that memory mapped files are not treated specially; the entire contents of the file that is mapped are preferably recorded in the event log so that the effects of the memory map operation may be replayed. This is because the memory mapped file may be in a different state (or may not even exist) during replay. However, it is possible to optimise this case by recording and replaying the on-demand mapping of pages of such files. Here, when a process maps a file during the reference execution, the instrumentation code ensures that the process does not really map the file, although the instrumented program is 'unaware' of this. This means that when the process attempts to access the pages of the file it believes are mapped, it will fault. The instrumentation code intercepts these faults, and maps the pages from the file, recording the contents of those pages in the event log. On replay, again the file is not mapped. However, this time when the replay process faults accessing the pages, the instrumentation code obtains the contents of those pages from the event log, and maps the pages and initialises them appropriately. Alternatively, memory mapped files may be considered as shared memory, and dealt with as described below.

Asynchronous events: It is important that asynchronous events are replayed substantially exactly as they occur during the reference execution. During the reference execution, we use instrumentation to obtain a sufficient level of control over when asynchronous events happen, so that these events may be faithfully reproduced in replay mode. This means that all asynchronous events are preferably delivered to the instrumented program at basic block boundaries.

Asynchronous messages: Many modern operating systems provide a facility where an application can register an asynchronous event handling function. When the asynchronous event occurs, the operating system interrupts the program, transferring control directly to the handler function. When the handler function returns, the program proceeds as before interruption. This mechanism may be referred to as asynchronous signal delivery, or software interrupt servicing.

Such asynchronous events are preferably controlled to ensure that they are essentially entirely repeatable. To achieve this, during the reference execution, the instrumentation code intercepts system calls to set up a handler for an asynchronous message. The request is manipulated such that the instrumentation intercepts asynchronous messages.

Figure 6:
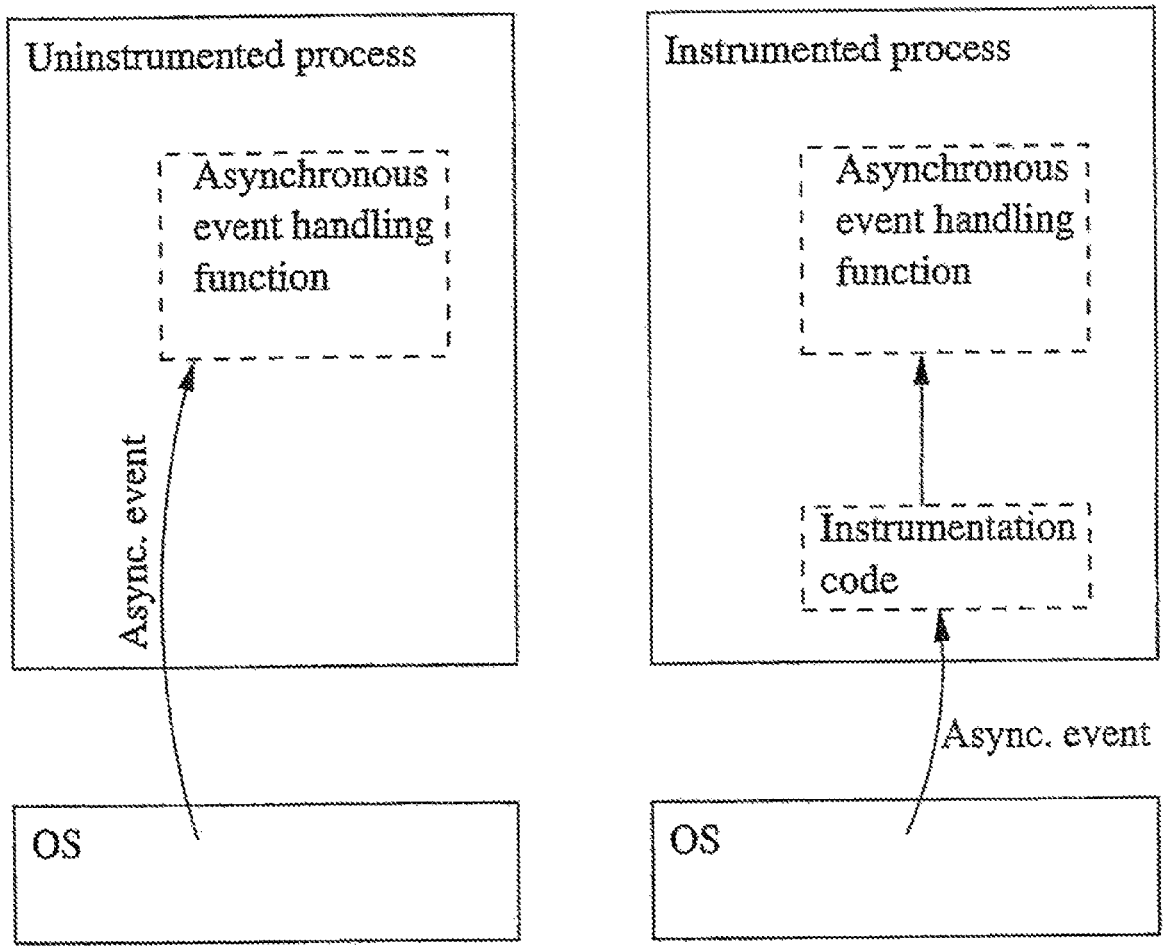
FIG. 6 shows interception of asynchronous events.

This is depicted in FIG. 6. The instrumentation code does not deliver the asynchronous notification directly to the program (i.e. it will not directly call the program's asynchronous event handler function). Instead the instrumentation code's event handling function record the asynchronous event to the event log, and then arrange for the event handler to be executed under the control of instrumentation.

When replaying, asynchronous events are not delivered to the replay process at all. Instead, each time a basic block is executed, the event log is checked. If an event is scheduled for the current basic block, then the process's event handling function is called, thus faithfully replaying the asynchronous event.

As well as providing determinism, this mechanism also ensures that the asynchronous event handling function is instrumented when it is called. Otherwise, if the operating system is allowed to call the program's event handling function directly, then the original, uninstrumented code will be called, and we will 'lose' instrumentation.

Note that message-based systems such as Microsoft Windows® use a system call to retrieve the next message from a message queue; the mechanism outlined above covers this case.

Threads: There are two main ways to implement multithreading within a process: kernel managed threads, and user managed threads. With user-managed threads, a usermode library is responsible for threading. Thread pre-emption is performed by the library by responding to asynchronous timer events—hence any non-determinism resulting from user-managed multithreading can be removed using the techniques described above with reference to Asynchronous events.

However, most modern computer systems use kernel-managed threads. Here the operating system kernel is responsible for switching and otherwise managing threads, in general entirely without direct support from the application. There are several mechanism that can be employed to obtain deterministic kernel-managed threads.

One technique is to use the instrumentation code to implement 'virtual-kernel-managed threads', which involves the instrumentation code effectively providing user-managed threads, but letting the application 'believe' it is using kernel managed threads. Here, the system call to create a new kernel managed thread is intercepted by the instrumentation code, and subverted such that the instrumentation code creates a virtual kernel-managed thread within the single real kernel managed thread. The instrumentation code multiplexes all virtual kernel-managed threads onto a single real kernel-managed thread. This means that thread switching is under control of the instrumentation code and can be made essentially entirely deterministic. The instrumentation code can provide pre-emptive multithreading by effecting a virtual kernel-managed thread switch every n basic blocks (e.g. where n=10,000).

Here, care must be taken if we wish to ensure deadlock is avoided. If a virtual kernel-managed thread blocks waiting for the action of another virtual kernel-managed thread, since both virtual threads are running within a single real thread, deadlock can result. (A particularly common example of this problem is when two virtual kernel-managed threads contend on a mutual exclusion primitive; if care is not all virtual kernel-managed threads will deadlock). One way to avoid deadlock on a UNIX system to periodically arrange for the process to be delivered an asynchronous timer signal, such that blocking system calls will be interrupted, returning EINTR.

An alternative mechanism involves letting the program create kernel-managed threads as normal, but subverting the thread creation such that the instrumentation code has control over which thread is executing at which time. This might involve modifying the threads' priorities such that the instrumentation code can control which thread the OS will execute, or perhaps artificially blocking all but one thread at a time by e.g. having all kernel managed threads contend on a single kernel-managed mutex (which we shall call 'the debugging mutex'). This technique would also suffer a similar deadlock problem referred to above. Here if the kernel-managed thread that owns the mutex waits for an operation to be completed by another thread, the system will deadlock. (This is because the other thread will never be able to complete its work because it is waiting for the debugging mutex, yet the thread that owns the debugging mutex will never release it because it is waiting for that other thread.) Fortunately, the only way a thread can block awaiting the result of another is through a system call. Therefore, this problem can be overcome by ensuring that any thread drops the debugging mutex before entering any system call that may block, and then takes it again on return from said system call (note that there is no problem if a thread "busy-waits" because eventually it will execute a maximum number of basic blocks and then drop the debugging mutex). However, if the debugging mutex is to be dropped when a system call is issued, care must be taken to ensure that the system call does not modify the program's internal state in a way that voids determinism. For example, if the system call is reading data off the network and writing that data into the program's address space while concurrently another thread that holds the debugging mutex is reading that same memory, non-deterministic behaviour will result. Fortunately, this problem can be avoided be having the system call read not into the program's internal state, but into the event log. After the debugging mutex has been taken on behalf of the thread that issued the system call, then the data that was read by the system call into the event log can then be copied into the program's internal state. This trick can be implemented with relatively little work, since we already have the requirement that system calls that write into user memory have their results stored in the event log. Therefore, rather than have the system call read into program memory and then copying that data into the event log, we instead subvert parameters to the system call such that data is read directly into the event log, and have the instrumentation code subsequently copy from the event log into program memory, but only once the debugging mutex has been taken.

Shared memory: If a process being debugged shares memory with another process, it is possible to exploit the operating system's memory protection mechanism to provide deterministic replay.

Suppose that there are two processes, A and B, that share some portion of memory M, such that both processes have read and write permissions to access M. Process A is being run under instrumentation for bidirectional or backwards debugging, but process B is not. The shared memory M is initially mapped such that process B has read-only access, and A has full access. We describe this situation as process A having ownership of memory M. Any attempt by process B to read memory M will succeed as normal, but any attempt by process B to write to M will result in a page fault. This fault is responded to by memory M being mapped read/write to process B, and unmapped completely from process A. We refer to this process B taking ownership of the memory. Here, any attempt to access M (either for reading or for writing) by A will result in a page fault. This is responded to by reverting ownership of M to A, but in addition sufficient state being stored in the event log to replay the changes to M made by B. That is, the difference of the memory M between the point when A last had ownership of that memory and the current time is stored in the event log.

When replaying, the difference in memory is retrieved from the event log and applied at the appropriate time. Thus the effect on A of B's asynchronous modification of memory M can be replayed deterministically.

Note that the above scheme can easily by generalised so that process B is actually a group of one or more processes.

An alternative approach is to record in the event log every memory read performed by A on the shared memory M. This has the advantage of being a simpler implementation, but depending on the usage of the shared memory may result in the recording of an unacceptable amount of state in the event log, as well as adversely affecting temporal performance.

We will next describe implementation and structure of the event log. As we have seen, there are several kinds of events that need to be recorded in the event log: Non-deterministic instruction results (including the return codes and memory modifications made by system calls), Asynchronous events (including asynchronous signal delivery), Thread Switches, and Shared memory transactions.

Preferably the memory used to store the event log is accessible by the process in record and replay mode. This means that if the UNIX fork facility is used to snapshot processes, then the memory used to store the event log should be shared between each process created with these forks. However preferably the event log (and all memory used by the instrumentation code) is not usable as the internal state of the program being debugged; to prevent this all memory transactions by the program being debugged can be intercepted by the instrumentation code, and access to memory used by the instrumentation code (including the event log) can be denied to the program being debugged.

Preferably the event log itself is stored as a linked list, where each node contains the type of event, data sufficient to reconstruct that event during replay, and the time at which that event happened (where time is based on the number of instructions executed to that point or some approximation thereof, preferably combined with the number of non-deterministic or asynchronous events executed to that point).

Then when in replay mode, between each basic block it is necessary only to inspect the current time, and compare it with the time of the next non-deterministic event in the event log. In the common case that the current time is less than the time for the next non-deterministic event, the coming basic block can be executed without further delay. If there is a non-deterministic event to replay in the coming basic block then the instrumentation must arrange for the effects of the said non-deterministic event to reconstructed at the corresponding time in the coming basic block.

We will next describe searching history. In general, it is more useful for a bidirectional or backwards debugger to be able to search history for a particular condition, as opposed to wind a program back to an absolute, arbitrary time. Some examples of the kinds of conditions it is useful to be able to search are:

- The previously executed instruction
- The previously executed source code line
- The previously executed source code line at the current function call depth
- The call site for the current function
- The previous time an arbitrary instruction or source code line was executed More generally, it is useful to be able to rewind a debugged program to the previous time an arbitrary condition held, such as a variable containing a given value, or even completely arbitrary conditions, such as some function returning a particular value.

We have implemented an algorithm to search an execution history for such arbitrary conditions. The most recent snapshot is taken, and played forward testing for the condition at the end of each basic block. Each time the condition holds, the time is noted (if a time is already recorded because the condition held earlier, it is overwritten). When the history is replayed up to the debug point, the most recent time at which the condition held will be stored. If no such time has been recorded because the condition did not hold since the most recent snapshot, then the search is repeated starting from the next most recent snapshot, up to the most recent snapshot. That is, suppose that the debugged program is currently positioned at time 7,000, and there are snapshots at times 0; 2,000; 4,000; and 6,000. We start at the snapshot at time 6,000 and play forwards until time 7,000, testing for the condition between each basic block. If the condition never holds between times 6,000 and 7,000, then we rewind to the snapshot taken at 4,000, and play that forwards to 6,000, searching for the event. If the condition still isn't found to hold, we check 2,000-4,000, and so on.

Note that this algorithm will not work reliably with the instrumentation technique of FIG. 4 if searching for the most recent time at which a variable held a particular value. This is because a variable's value may change to and then from the required value entirely within a basic block. To overcome this, there is an enhancement to the instrumentation technique shown in FIG. 4—each memory write operation is considered a basic block terminator. (This approach can also be used to ensure that a program that has gone hay-wire does not write over the event log or other instrumentation data structures.) This form of instrumentation will operate less efficiently than the one shown in FIG. 4; however should the performance become problematic, it is possible to run with both forms of instrumentation, switching between the two as necessary.

(Note that the algorithm described in this section does work reliably when searching for particular values of the program counter with the instrumentation technique shown in FIG. 4.)

We have described a bidirectional or backwards debugging mechanism that can be conveniently implemented on most modern operating systems for example including, but not limited to, Linux and Windows®. A process can be rewound and its state at any time in its history can be examined. This is achieved by regularly snapshotting the process as it runs, and running the appropriate snapshot forward to find the process' state at any given time. Non-determinism may be removed using a machine code instrumentation technique.

Our implementation for the Linux operating system is responsive and pleasant to use, and promises to greatly reduce debugging times for particularly subtle and difficult bugs. We have also implemented a searching technique that permits the most recent time that an arbitrary condition holds in a process's history.

Our technique of instrumenting machine code rather than source-level analysis is particularly important, because it means the system copes with bugs where the compiler-dictated control flow is subverted (e.g. overwriting a function's return address on the stack).

Further Techniques for the Deterministic Replay of Computer Programs

We now describe some further techniques for instrumenting execution of a computer program such that sufficient information may be recorded in an efficient manner to provide deterministic replay of the said computer program in the light of shared memory accesses, and when the said computer program is multithreaded.

Techniques we describe for identifying processes with shared memory access, such as threads or multicore processes, comprise arranging process (thread) memory ownership to deliberately provoke memory page faults, to identify and handle concurrent memory access by multiple threads in such a manner as to enable deterministic replay, and hence backwards debugging.

Deterministic replay of a recording of a computer program can be achieved providing that (a) the program is replayed using the same starting state as the recording, and (b) inputs and other non-deterministic effects are synthesised to be replayed exactly as occurred during the recording. Such sources of non-determinism include:

i) non-deterministic instructions, including system calls (e.g. reading from a file or network)
ii) asynchronous signals
iii) reads from shared memory
iv) ordering of accesses to memory by concurrent threads Here we describe techniques to address both (iii) and (iv) by using the MMU (memory management unit) to fault in (i.e. trap) accesses to certain memory locations and use such traps to determine the ownership of memory and track different users of the memory.

Shared memory: We define "shared memory" as memory whose contents when a given location is read by the program being debugged does not necessarily return the value most-recently written to that location by the program being debugged. Typically this is because the memory is shared with another program which may write a new value to the memory location between the program being debugged writing and reading it back. Shared memory may also be updated in such asynchronous fashion by the operating system (asynchronous IO), or by a device to which the program being debugged has direct access (e.g. with kernel-bypass IO such as Direct Memory Access, also known as DMA).

One way to record reads from shared memory such that they may be later replayed non-deterministically is to instrument all reads from memory, and for each access determine whether the address of the memory read is shared memory, and if it is, record to the event log the value read from shared memory. This imposes significant overheads, in particular, every single access to shared memory must be checked.

A better way is to use the system MMU to determine which instructions access shared memory. Here, all shared memory is remapped to a new virtual address, which is unknown to the program being debugged. This is termed the "really shared memory". In its place is mapped a new mapping, which we refer to as the "emulated shared memory". The MMU is programmed (e.g. via a call to mprotect on the Linux operating system) such that any access to the emulated shared memory shall result in a memory protection fault (also referred to as a memory protection trap). All such faults are intercepted, and in response to this the code that triggered the fault is retranslated such that when accessing memory it first checks the address to determine whether it is shared, and so (a) redirects the access to the "really shared memory" address, and (b) stores values read from the really shared memory location in the event log for later deterministic replay.

A further optimisation is to record in the event log only those shared memory locations that have been modified since the previous access by the program being debugged. To achieve this, a third mapping accompanies the "emulated shared memory" and the "really shared memory", which is known as "the third copy". The third copy is kept in sync with the really shared memory from the perspective of the program being debugged (in other words with the logical contents of the emulated shared memory, in that it contains the contents of the shared memory that will be read at the corresponding time during replay).

On access to the shared memory by the program being debugged, an event is added to the event log only if the really shared memory and third copy differ.

The algorithm for a retranslated instruction that accesses shared memory is:
  For each address A, that the instruction accesses:
  If address A is shared:
    compute address A1 as the equivalent really shared memory address
    compute address A2 as the equivalent third copy address
    alloctae a temporary variable T1
    If the instruction reads at A
      If the instruction also writes at A
        lock address A1
    copy contents of A1 into T1
    if the instruction reads at A and the contents of T1 differs from the contents of A2:
    copy contents of T1 into A2
    create a new event in the event log to indicate that this read from
    address A should be replayed to use the value now in T1.
    substitute T1 for A in the instruction
  Execute instruction as modified
  For each address A, . . . that the original unmodified instruction would access:
    If the instruction writes at A and address A is shared
      copy contents of T1 into A1
      If the instruction also reads at A
        unlock address A1

Locking an address prevents any other process from writing to it. The mechanism used to lock and unlock an address depends on the facilities provided by the hardware. On some types of computer, it may be possible to simply lock and unlock as described. On others, it may be possible only to determine whether another process has changed the contents of the address before writing back to it, and if so repeat the algorithm above again.

For the vast majority of programs, even those that make relatively heavy use of shared memory, the proportion of instructions actually accessing the shared memory is relatively small (compared e.g. to accesses to the stack). This technique ensure that only the relatively small proportion of instructions that access the shared memory have the extra overhead of dealing with shared memory, whereas most instructions run entirely unencumbered.

Multithreaded execution: The simplest way to deal with non-determinism due to differently-ordered accesses to memory by concurrent threads is to force serialisation of all threads when recording, and ensure that during deterministic replay each thread is executed in the same order as during record. In short, this means serialising all threads and recording thread switch events in the event log. However, such serialisation is unfortunate because it (a) slows down execution on multicore systems (i.e. only one of the CPU cores can be used at any one time), and (b) it changes the behaviour of the system compared to it being run normally (such lower fidelity can be mean bugs that are being investigated do not appear under the control of the debugger).

Here we present an improved mechanism that allows concurrent threads (processes) to be executed on multiple cores concurrently. It relies on the observation that multiple threads within a single (common) program is a similar arrangement to multiple programs using shared memory. i.e. the main difference between multiple threads and multiple programs is that multiple threads share memory. A variation on the technique described above for supporting deterministic replay of programs using shared memory can be used, allowing concurrent threads to be replayed without requiring strict ordering of memory accesses between those threads.

The idea is based on the observation that most memory locations referenced by most multithreaded programs will not in reality be "shared" between the multiple threads (e.g. most stack accesses are local to a specific thread). If memory within the program can be assigned an owning thread, and each thread is given its own event log, threads' accesses to memory locations that they do not own can be treated as accesses to conventional shared memory, as described above and threads' accesses to memory locations that they do own can proceed as normal Here, each memory location (or group of memory locations such as a page), is in one of the following states:
  unused (all memory is initially in this state)
  single-threaded (i.e. owned by a single thread; said thread is the only thread recently to have accessed this memory)
  multithreaded—i.e. shared between multiple threads (more than one thread has recently accessed the memory)

Memory locations can change ownership over time in the following ways:
  from unused to single-threaded,
  from single-threaded to unused, or
  from single-threaded to multithreaded, or
  from multithreaded to unused (ownership need never directly change from one thread to another). When recording, any read or write of memory address P by a thread T1 results in different behaviour depending on the ownership of memory P:
  Memory P is already owned by thread T1: continue as normal.
  Memory P is currently unused: thread T1 takes ownership of memory P, a memory ownership event is added to T1's event log, and then continue as normal.
  Another thread T2 owns memory P: memory P is marked as multithreaded, a memory ownership event is added to T2's event log, and the memory access continues as for shared memory accesses described above.
  Memory P is multithreaded: the memory is accessed as per conventional shared memory as documented above; if necessary, a memory-read event is added to T1's event log.

It is desirable to allow memory locations to be changed from multithreaded to single-threaded in the case that the memory's access pattern changes (e.g. perhaps the memory is on the heap, and is being used by multiple threads but is then freed and then reallocated for use by a single thread). To facilitate such a case, associated with each multithreaded memory location P is:

An identifier Tprev describing the most recent thread to access it, and

An integer N that holds of the number of consecutive accesses to it by thread Tprev For each access to multithreaded location P by thread T1, if P's Tprev is not T1, then P's Tprev is set to T1 and P's N is set to 0; otherwise, P's N is incremented. If P's N exceeds some threshold, the memory P is marked as being single-threaded and owned by T1, and a memory ownership event is added to T1's event log.

When replaying, it is important to synchronise memory ownership events to preserve ordering of memory accesses between threads. Specifically, when thread T1 replays a memory ownership event such that it becomes the owner of memory P, it should not proceed until the previous owner thread T2 has replayed its memory ownership change event marking the corresponding memory as not owned by it.

To implement this model, it is desirable to be able reliable to track which memory locations are accessed by which threads.

Implementation: The overheads of running on multiple cores concurrently (as opposed to running serially) will depend on the following factors (the values of which will depend on the implementation):

the relative proportion of the memory accesses by a thread that does not already own the memory being accessed, and the extra overhead incurred by a thread when accessing memory that it does not own (i.e. the memory is multithreaded), and the extra overhead incurred by a thread when accessing memory that it does own (i.e. the memory is single-threaded)

Three possible implementations are described below, each with different trade offs. In particular, the MMU can be used to trap accesses by a thread to memory which it does not own. This is attractive as it implies no extra overhead for a thread accessing memory it does own. Multiple threads within a process are not usually able to have different MMU mappings, but below we describe two ways this can be achieved (i and ii). A third implementation alternative (iii) is suggested, whereby the MMU is not used. This imposes some overhead even to accesses to single-threaded memory (as ownership must first be checked), but at the benefit of lower cost of accessing multithreaded memory.

i. MMU-based multiprocess: As alluded to above, multiple threads within a process is logically equivalent to multiple processes sharing memory. For each thread created by the program being debugged, in reality a new process is created, where all the memory is shared with the other "threads" of the program being debugged (where these other "threads" are in reality other processes).

Memory not owned by a thread (where in this context thread is in reality a process) should be mapped into the process at a different virtual address (effectively the "really shared mapping", as described above). Each process should also maintain a "third copy" for memory it does not own, again as described above.

In such an implementation, care would need to be taken to ensure correct operation of pan-process resources, including file-descriptors, signal handlers, resource limits, and newly-created memory mappings. In Linux, it is possible to create new processes with the CLONE_FS and CLONE_FILES flags, which eases this problem. Maintaining a perfect illusion of different processes being the same process may still be difficult to achieve, however.

ii. MMU-based single-process: It is possible to effectively give each thread within a process its own address space by offsetting each thread's memory access by some fixed amount, where each thread is assigned a unique offset such that the adding of any valid address to the offset does not yield another valid address.

This could be achieved by translating code differently for each thread, applying the relevant constant offset to all memory accesses.

The main disadvantage with such an approach is that it will put considerable pressure on the virtual address space. This is unlikely to be a problem in practice for programs with a 64-bit virtual address spaces, but may be prohibitive for 32-bit address spaces.

iii. MMU-less: Alternatively one can avoid use of the MMU, and keep a "meta-data" that gives a thread owner for each address, and every access would do a software check of ownership. This would impose overheads for single-threaded accesses to memory, although accesses to unused memory and some accesses to multithreaded memory would be cheaper (because in such cases there would be no memory protection faults).

Debugging of Shared Memory Errors in Multi-Process Environments

Figure 7:
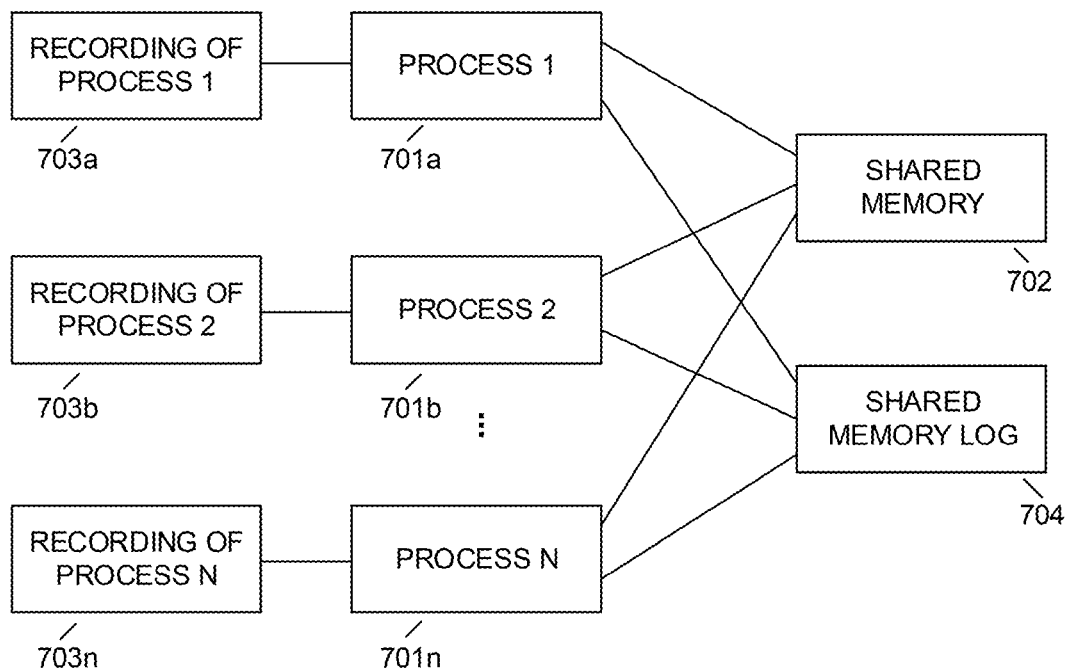
FIG. 7 shows an exemplary multi-process environment with shared memory.

Referring now to FIG. 7, a plurality of processes 701a . . . 701n are shown. The plurality of processes 701a . . . 701n may be separate programs or may be different instances of the same program, or may be a combination of different instances of the same program and different programs.

The plurality of processes 701a . . . n each have access to a shared memory 702 that the plurality of processes 701a . . . n may read and/or write to. The shared memory 702 may provide a means of communication between the plurality of processes 701a . . . n. However, it is possible that one or more of the processes have been incorrectly programmed. During the operation of an incorrectly programmed process, the process may erroneously cause the shared memory 702 to become corrupted. Another process that subsequently attempts to access the corrupted memory may then fail through no fault of its own. Attempts to debug the failed process will not resolve the problem as the root cause of the failure was due to a programming error in another process. In addition, given that many processes may have access to the shared memory 702, it may be challenging to identify the process responsible for causing the error in the shared memory 702.

In order to provide debugging of errors in the shared memory 702, the machine code of the plurality of processes 701a . . . n is instrumented such that execution of the instrumented machine code generates a recorded execution of the process that can be deterministically replayed. In this regard, FIG. 7 shows a recorded execution 703a . . . n corresponding to each process of the plurality of processes 701a . . . n. The instrumentation of the machine code may be carried out using the techniques described above.

Each process of the plurality of processes 701a . . . n is configured to log accesses to the shared memory 702 in a shared memory log 704. The logging of accesses to the shared memory 702 may be achieved through instrumentation of the machine code. The accesses to the shared memory 702 may be logged during execution of the instrumented machine code of the plurality of processes 701a . . . n to generate the corresponding recorded executions 703a . . . n. The instrumentation for logging shared memory accesses may be performed dynamically. That is, the machine code may be instrumented at the point of execution rather than prior to execution such as during the generation of the machine code (compilation).

The shared memory log 704 is configured to be accessible by each of the plurality of processes 701a . . . n. In this way, there is a common log of shared memory accesses. The shared memory log 704 may be stored as a file (either a single file or as a plurality of files), or stored using block-based storage, or stored using object-based storage as deemed appropriate by a person skilled in the art. The shared memory log 704 may reside in the shared memory 702 initially and be written out to storage.

The recorded executions 703a . . . n and the shared memory log 704 may be analysed to debug errors in the shared memory 702 and to identify the process that caused the error in the shared memory 702. The error in the identified process may be fixed and thus, the failure of any processes caused by accessing an invalid state of the shared memory 702 can be resolved.

The use of a shared memory log 704 in combination with the techniques for backwards debugging described above, enables a backwards debugger to rewind to any point in the history of the plurality of processes 701a . . . n and to determine how the plurality of processes are interacting with the shared memory 702. In addition, the history of a particular location of the shared memory 702 can also be determined and analysed.

A list of accesses by the plurality of processes 701a . . . n to a location of the shared memory 702 may be generated based upon the shared memory log 704. For example, the recording of a failed process (or any process) may be replayed to reveal a particular suspect memory location in the shared memory 702. A list comprising previous accesses by the plurality of processes 701a . . . n to the particular memory location up to the current point in the replayed execution may be generated based upon the shared memory log 704 to identify the processes that accessed the particular memory location. The list of previous accesses may be generated in conjunction with replaying the recorded executions 703a . . . n of each of the plurality of processes 701a . . . n and analysing the operations performed with respect to the particular memory location in the shared memory 702. The generated list of accesses and the recorded executions 703a . . . n may be analysed to identify the process that caused the error in the shared memory 702.

The plurality of processes 701a . . . n may be a subset of all of the processes that have access to the shared memory 702. For example, a user may select particular processes to record and log accesses to the shared memory 702. The techniques described herein means that it is not a requirement that all of the processes that access the shared memory 702 need be recorded and their accesses logged.

Referring now to FIG. 8, an exemplary shared memory log 704 is shown. Whilst FIG. 8 shows a particular form of shared memory log 704, it will be appreciated that the shared memory log 704 is not limited to one particular form and other forms of shared memory log 704 may be used as deemed appropriate by a person skilled in the art.

The shared memory log 704 may comprise a plurality of entries 801a . . . n, each entry corresponding to an access of the shared memory 702 by one of the plurality of processes 701a . . . n at a particular point in the corresponding recorded execution. The entries may be arranged according to the order of execution of the accesses, that is, an access that occurs at an earlier point in time may appear before an access that occurs at a later point in time in the shared memory log 704. By arranging the entries in order of execution, the shared memory log 704 may be used to synchronise the plurality of processes 701a . . . n during replay of the recordings 703a . . . n.

Each entry 801a . . . n may comprise data indicative of the process performing the access 802, an access mode of the access 803, a location of the shared memory being accessed 804, an access length 805 and a time of the access 806.

In more detail, the data indicative of the process performing the access 802 may be a process identifier. The access mode 803 may indicate whether the access was a read access or write access. The location of the shared memory being accessed 804 may, for example, be an address of the shared memory being accessed. The access length 805 may be the number of bytes read or written by this access. The time of access 806 may be the number of instructions or the number of basic blocks executed by the process performing the access or may be a wall clock time. The time of access 806 may be used to identify the instruction that performed the corresponding access in a particular process. Alternatively, or in addition, data indicative of the instruction performing the access may also be stored in an entry.

The data associated with the access, that is, the data that was read from the shared memory on that particular access or the data that was written to the shared memory, may be determined based upon the recording of the execution of the corresponding process that made the access. For the example, the recording may be replayed to determine the data of the corresponding access operation performed by the process. In this way, the size of the shared memory log 704 may be reduced. Alternatively, the data associated with the access may be stored in the shared memory log 704 to provide a potentially quicker determination of the data. The list of accesses for a particular memory location described above may comprise the data associated with the accesses.

As discussed above, reading from shared memory is a source of non-determinism for a process given that another process or external entity can modify the shared memory without the process being aware. As such, when recording the execution of a process, read accesses of the shared memory may need to be captured to enable deterministic replay of the process. In this regard, it is possible to capture all shared memory reads during recording to ensure deterministic replay. However, this approach may be inefficient if the shared memory is read more frequently than it is updated as the same data will be captured often.

As such, a more efficient implementation may be to utilize a data structure that reflects the state of the shared memory 702 and to capture the returned data from reads of the shared memory 702 that has different data. An illustrative example is shown in FIG. 9 in which a cache 901a reflects the current state of the shared memory at time $t_1$.

At time $t_2$, a read of the shared memory 702 occurs. A comparison of the returned data with the state of the cache indicates that no data has changed in the shared memory 702 and as such, it is not necessary to capture the returned data at time $t_2$. The cache remains unchanged as shown at 901b. It will be appreciated, that the returned data may be for a particular memory location of the shared memory 702 and the comparison may be performed against the location of the cache 901a that corresponds to that shared memory location.

At time $t_3$, a further read of the shared memory 702 is performed. This time, a comparison of the returned data with the state of the cache indicates that the shared memory 702 has changed in the intervening time between $t_2$ and $t_3$. The difference data 902 between the returned data and the state of the cache 901b is captured and the state of the cache 901c is updated to reflect the new state of the shared memory 702.

At time $t_4$, another read of the shared memory 702 does not yield any new data and the cache 901d is unmodified. At time $t_5$, however, a change in the state of the cache and hence shared memory 702 is determined. The difference data 903 is captured and the cache 901e is updated.

As the cache is intended to reflect the current state of the shared memory, the notional size of the cache will be the same as the size of the shared memory 702. However, the actual physical size of the cache may be much smaller as physical memory can be lazily-allocated for the cache by the kernel. That is, only the required amount of memory to store the non-empty portions of the cache may need to be allocated. As the size of the cache only increases in response to changes in the state of the shared memory 702, the physical size of the cache only increases when necessary.

For replaying of a recorded execution, the state of the shared memory can be reconstructed from the initial state of the cache 901a and applying the difference data 902, 903 at the appropriate time to update the cache 901a-e. Thus, in order to achieve deterministic replay of read operations from shared memory 702, the returned data may be obtained from the cache given the correspondence to the state of the shared memory 702 at that time in the original execution. It will be appreciated that only the initial state of the cache 901a and the difference data 902, 903 is required to be stored after recording and for replay. The initial state of the cache 901a is likely to be largely empty and therefore easily subject to compression. As such, the storage requirements of the cache for replaying may be small.

As the difference data 902, 903 may be used to update the cache, the difference data 902, 903 may be considered as cache update data.

It will be appreciated that the example illustrated in FIG. 9 is schematic and not limiting. The components shown in FIG. 9 have been simplified for clarity and ease of explanation. For example, the cache 901a-e is shown as a small one-dimensional structure for simplicity.

Figure 10:
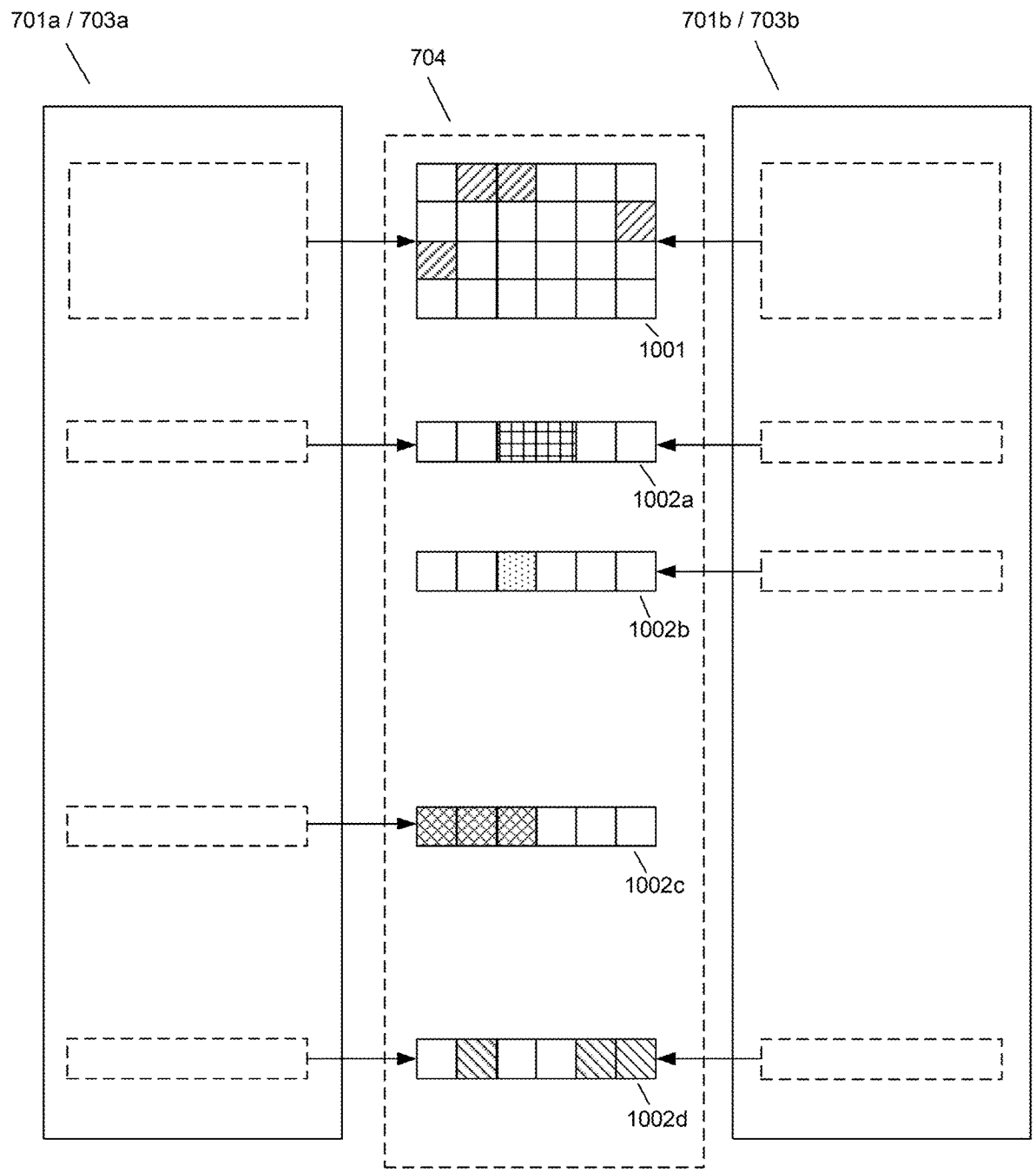
FIG. 10 shows a common cache for a multi-process environment.

Referring now to FIG. 10, in a multi-process environment such as that of FIG. 7, a common cache 1001 may be used to track the state of the shared memory 702 during recording and replay to avoid the need for individual processes to have its own cache and to reduce overall memory and storage requirements. Redundancy in the difference data 1002a-d can also be avoided by using the common cache 1001.

The above describes capturing difference data from read accesses to the shared memory 702. Alternatively, if all of the processes that have access to the shared memory 702 are being recorded and no other entities can modify the shared memory 702, then differences in the shared memory 702 caused by writes to the shared memory 702 may be captured instead of reads. In another variation, a combination of read difference data and write difference data may be captured, the appropriate combination of reads and writes to be captured may be determined by a person skilled in the art. As such, the shared memory log 704 may comprise update data to the cache based upon a change in the shared memory 702 caused by a shared memory access.

Figure 11:
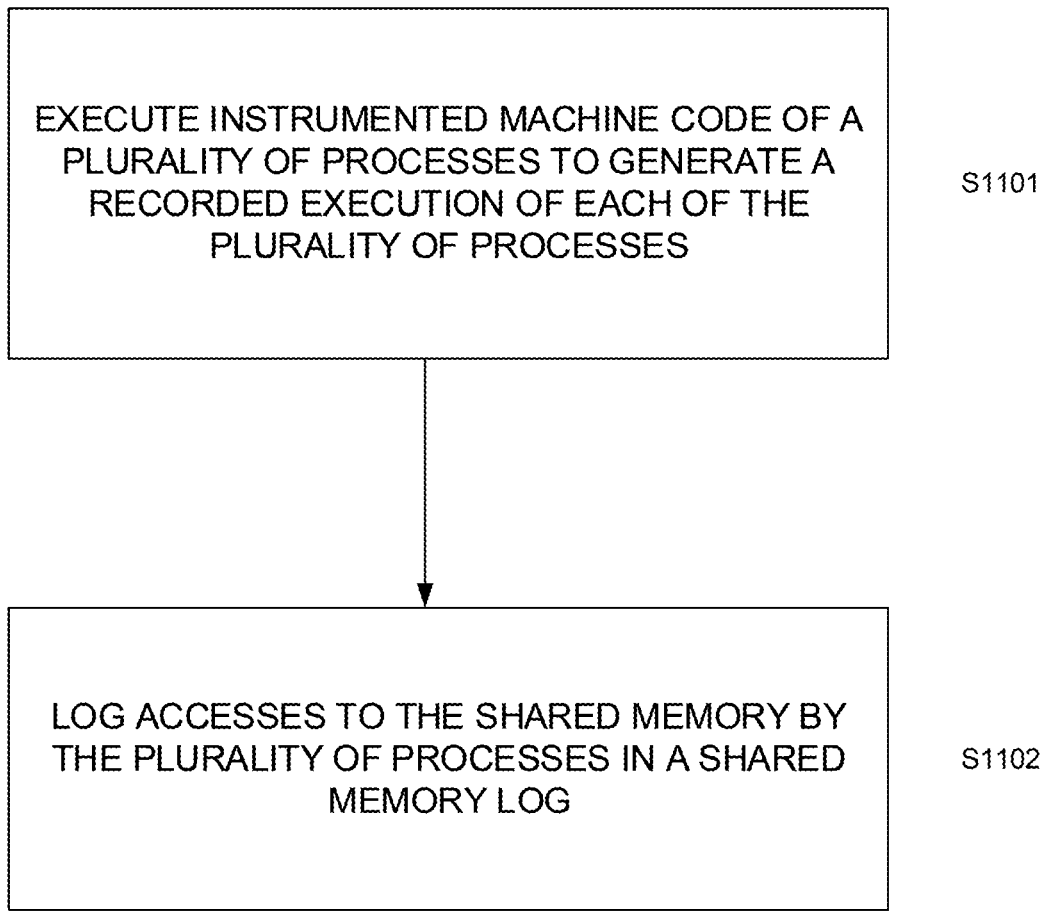
FIG. 11 shows exemplary processing for debugging errors in a shared memory.

Referring now to FIG. 11, exemplary processing for debugging errors in a shared memory will now be described. It will be appreciated that whilst the processing is shown as comprising steps in a particular order, the processing may be carried out in a different order as deemed appropriate to a person skilled in the art. The processing may be applied to the multi-process environment described above with respect to FIG. 7.

At step S1101, instrumented machine code of a plurality of processes 701a . . . n is executed to generate a recorded execution 703a . . . n of each of the plurality of processes 701a . . . n for deterministic replay of the recorded execution 703a . . . n. The instrumentation of machine code and recording of an execution may be carried out using the techniques described above.

At step S1102, accesses to the shared memory 702 by the plurality of processes 701a . . . n are logged in a shared memory log 704 for debugging errors in the shared memory 702. The shared memory log 704 is accessible by each of the plurality of processes 701a . . . n.

The debugging may be carried by analysing the recorded executions 703a . . . n and the shared memory log 704 as described above. For example, a list comprising accesses by the plurality of processes 701a . . . n to a location of the shared memory 702 may be generated based upon the shared memory log 704 as described above. A process of the plurality of processes 701a . . . n that caused the error in the shared memory 702 can be identified based upon the shared memory log 704 and the recorded executions 703a . . . n.

In more detail, a recorded execution of one of the plurality of processes 701a . . . n may be replayed. At any point in replaying the recording, a list comprising previous accesses by the plurality of processes to a location of the shared memory 702 prior to a current point in the replayed execution may be generated based upon the shared memory log 704. The generation of the list of previous accesses may be further based upon replaying the recorded executions of each of the plurality of processes 701a . . . n. In combination with backwards debugging techniques, it is possible to generate a history of accesses to any location of the shared memory at any arbitrary point in time of the recorded history and subsequently to interactively rewind the state of any process and of the shared memory 702. This provides a powerful tool for identifying the process that caused the error in the shared memory 702 and for debugging the error.

A more detailed example of some the above techniques will now be described. In one example, the logging could be affected by insertion of additional machine instructions around each instruction that touches the shared memory where the shared memory log 704 is updated with the address, type of and size of the access (e.g. read 4 bytes from address 0x7ff0080100). It may be useful to keep a pointer to the head of the shared memory log 704, this pointer being updated by each of the recorded processes at the time of access. The pointer might be protected by a mutex, a "spin lock" or the processes might coordinate using lock-free synchronisation, such as atomic exchange-and-add or load-locked, store-conditional instructions should the targeted machine support them. An example such translation follows:

read address 0x1234000→register r0 translates to:

acquire shmem log spin lock store (read, 0x1234000, 4 bytes, process-id, bbcount) at the shmem log's head read 4 bytes from 0x1234000 into register r0 increment the shmem log head pointer release the shmem log spin lock

In this example, it is important that the shmem log (shared memory log 704) is updated in the same order in which the access to the shared memory happens.

Although specific embodiments of the invention have been described above, it will be appreciated that various modifications can be made to the described embodiments without departing from the spirit and scope of the present invention. That is, the described embodiments are to be considered in all respects exemplary and non-limiting. In particular, where a particular form has been described for particular processing, it will be appreciated that such processing may be carried out in any suitable form arranged to provide suitable output data.

The invention claimed is:

1. A method for debugging errors in a shared memory, the method comprising:
executing instrumented machine code of a plurality of processes to generate a recorded execution of each of the plurality of processes for deterministic replay of the recorded execution, each of the plurality of processes being an independently deterministically replayable entity;
logging accesses to the shared memory by each of the plurality of processes in a shared memory log for debugging errors in the shared memory by analysing the recorded executions and the shared memory log; and
wherein the shared memory log is accessible by each of the plurality of processes and wherein the shared memory log includes data indicative of a time of access of the shared memory by each of the plurality of processes associated with a write to the shared memory.

2. The method of claim 1, further comprising:
generating a list comprising accesses by the plurality of processes to a location of the shared memory based upon the shared memory log.

3. The method of claim 1, further comprising:
replaying the recorded execution of one of the plurality of processes; and
generating a list comprising previous accesses by the plurality of processes to a location of the shared memory prior to a current point in the replayed recorded execution based upon the shared memory log.

4. The method of claim 3, wherein generating the list is further based upon the replaying the recorded executions of each of the processes of the plurality of processes.

5. The method of claim 1, further comprising:
identifying a process of the plurality of processes that caused an error in the shared memory based upon the shared memory log and the recorded execution of each of the plurality of processes.

6. The method of claim 1, wherein the shared memory log comprises data indicative of one or more of the following: an access mode, a location of the shared memory being accessed, and an access length.

7. The method of claim 1, wherein data associated with an access to a location of the shared memory is determined based upon replaying a corresponding recorded execution.

8. The method of claim 1, wherein the accesses are stored in the shared memory log in order of execution of the accesses by the plurality of processes.

9. The method of claim 1, wherein the shared memory log comprises a cache indicative of an initial state of the shared memory.

10. The method of claim 9, further comprising:
determining whether a shared memory access alters data stored in the shared memory based upon a comparison to the cache when recording the execution of the plurality of processes; and
updating the shared memory log with cache update data based upon a change in the shared memory caused by the shared memory access.

11. The method of claim 10, further comprising:
updating the cache based upon the cache update data.

12. The method of claim 10, further comprising:
determining data associated with the shared memory access based upon the cache and the cache update data when replaying a process of the plurality of processes.

13. The method of claim 1, wherein the plurality of processes are a subset of the processes that have access to the shared memory.

14. The method of claim 1, wherein the method is carried out by a backwards debugger configured to replay a recorded execution of a process, wherein replaying comprises reversing the process' state to a previous state in the recorded execution.

15. The method of claim 1, wherein the instrumented machine code is dynamically instrumented for logging shared memory accesses.

16. A computer system comprising:
a memory storing processor readable instructions;
a processor arranged to read and execute instructions stored in the memory;
wherein the processor readable instructions are arranged to cause the processor to carry out a method comprising:
executing instrumented machine code of a plurality of processes to generate a recorded execution of each of the plurality of processes for deterministic replay of the recorded execution, each of the plurality of processes being an independently deterministically replayable entity;
logging accesses to a shared memory by each of the plurality of processes in a shared memory log for debugging errors in the shared memory by analysing the recorded executions and the shared memory log; and
wherein the shared memory log is accessible by each of the plurality of processes and wherein the shared memory log includes data indicative of a time of access of the shared memory by each of the plurality of processes associated with a write to the shared memory.

17. A non-transitory computer readable medium comprising processor readable instructions, wherein the processor readable instructions are arranged to cause a processor to carry out a method comprising:
executing instrumented machine code of a plurality of processes to generate a recorded execution of each of the plurality of processes for deterministic replay of the recorded execution, each of the plurality of processes being an independently deterministically replayable entity;
logging accesses to a shared memory by each of the plurality of processes in a shared memory log for debugging errors in the shared memory by analysing the recorded executions and the shared memory log; and
wherein the shared memory log is accessible by each of the plurality of processes and wherein the shared memory log includes data indicative of a time of access of the shared memory by each of the plurality of processes associated with a write to the shared memory.

* * * * *